(12) United States Patent (10) Patent No.: US 8,074,017 B2
Cavallo (45) Date of Patent: Dec. 6, 2011

(54) ON-DISK CACHING FOR RAID SYSTEMS

(75) Inventor: Joseph S. Cavallo, Waltham, MA (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 11/464,029

(22) Filed: Aug. 11, 2006

(65) Prior Publication Data

US 2008/0040540 A1 Feb. 14, 2008

(51) Int. Cl.
*G06F 13/00* (2006.01)
(52) U.S. Cl. .......................... 711/114; 711/173
(58) Field of Classification Search .............. 711/4, 100, 711/113–115, 161–162; 714/5–6
See application file for complete search history.

(56) References Cited

U.S. PATENT DOCUMENTS

| | | | | |
|---|---|---|---|---|
| 4,920,478 A * | 4/1990 | Furuya et al. | ................. | 711/136 |
| 5,778,430 A * | 7/1998 | Ish et al. | ........................ | 711/133 |
| 5,822,782 A * | 10/1998 | Humlicek et al. | ............ | 711/170 |
| 6,067,635 A * | 5/2000 | DeKoning et al. | ................ | 714/6 |
| 6,148,368 A | 11/2000 | DeKoning | | |
| 6,460,122 B1 * | 10/2002 | Otterness et al. | ............. | 711/154 |
| 6,567,889 B1 | 5/2003 | DeKoning et al. | | |
| 6,922,752 B2 * | 7/2005 | Uysal et al. | .................... | 711/114 |
| 7,035,974 B2 | 4/2006 | Shang | | |
| 7,051,156 B2 | 5/2006 | Shang | | |
| 2005/0071557 A1* | 3/2005 | Kawamura et al. | ........... | 711/114 |
| 2006/0259683 A1* | 11/2006 | Bridge, Jr. | .................... | 711/112 |

FOREIGN PATENT DOCUMENTS

| JP | 10161938 A | * | 6/1998 |
|---|---|---|---|
| WO | 2008021993 A1 | | 2/2008 |

OTHER PUBLICATIONS

PCI Express Base Specification Revision 1.0, Jul. 22, 2002, 428 pgs.
American National Standard: For Information Technology-Fibre Channel-Physical and Signalling Interface-3 (FC-PH-3), Developed by Incits, 1998, 138 pgs.
Serial AT: High Speed Serialized AT Attachment: Revision 1.0a, Jan. 7, 2003, APT Technologies, Inc., Dell Computer Corporation, IBM Corporation, Intel Corporation, Maxtor Corporation, Seagate Corporation, 311 pgs.
Information Technology—Serial Attached SCSI—1.1 (SAS-1.1), Working Draft American National Standard: Project T10/1601-D Revision 1, Sep. 18, 2003, 464 pgs.
Serial ATA II: Extensions to Serial ATA 1.0a Revision 1.2, Aug. 27, 2004, 110 pgs.

(Continued)

*Primary Examiner* — Sanjiv Shah
*Assistant Examiner* — Zhuo Li
(74) *Attorney, Agent, or Firm* — Grossman, Tucker, Perreault & Pfleger, PLLC (57) ABSTRACT

A method according to one embodiment may include creating a reserved partition on at least one volume of a RAID system. The method may also include creating a table to map data stored in the reserved partition to at least one intended volume address of at least one volume of the RAID system. The method may also include writing data associated with a RAID data write request into the cache memory, writing the data into the reserved partition, and updating the table to reflect data stored in the reserved partition.

18 Claims, 8 Drawing Sheets

OTHER PUBLICATIONS

Wang, Y. et al., "An efficient address mapping method for the shared multi-port cache in RAID," Proceedings of the 2005 International Conference on Communications, 2, circuits and systems,(May 2005). Abstract enclosed.

International Search Report and Written Opinion issued in PCT/US2007/075637 dated Dec. 10, 2007,11 Pages.

"Intel® RAID Controller write back cache policy setting during BBU charge cycle", Server Products, Â©Intel Corporation, Dec. 2, 2009, available at: http://www.intel.com/support/motherboards/server/sb/cs-023687.htm.

Treadway, Tom, "Write-back cache: Battery vs Disk", Storage Advisors Weblog, Storage Interconnects & RAID, Jun. 28, 2007, available at: http://storageadvisors.adaptec.com/2007/06/28/write-back-cache-battery-vs-disk/.

McIntyre,David, "Using FPGAs to build battery-free RAID cache memory systems", Altera Corporation, Feb. 17, 2010, available at: http://www.embedded.com/design/223100176.

Office Action received for Chinese Patent Application No. 200780026171.X, mailed on Jun. 9, 2010, 3 pages of Office Action and English translation of 2 pages.

International Preliminary Report on Patentability for PCT Patent Application No. PCT/US2007/075637, mailed on Feb. 26, 2009, 7 pages.

Taiwanese Office Action dated Nov. 18, 2010 issued in related Taiwanese Patent Application No. 96129427 (5 pages; translation 4 pages).

* cited by examiner

Fig. 1

| LBA in Reserved Partition 202 | Intended LBA in Data Partition 204 |
|---|---|
| | |
| | |
| | |
| ⋮ | ⋮ |
| | |

ON-DISK CACHING FOR RAID SYSTEMS

FIELD

The present disclosure relates to on-disk caching for RAID systems.

BACKGROUND

RAID-5 volumes offer data protection at a significant write performance penalty over single disk volumes because of the parity operand reads and parity result writes. The penalty can result in ⅓ to ⅐ the write throughput. There are various strategies for reducing the penalty. One strategy is RAID-1/RAID-5 hybrid which attempts to make the hard working parts of the volume use RAID-1 protection and the rest of the volume use RAID-5. Its drawbacks are the following. RAID-1 is still not as fast as single disk. When data needs to be transferred between the RAID-1 part and RAID-5 part then it incurs even worse performance than just RAID-5. It lessens the capacity of the overall volume.

Another strategy is battery backed up, unpluggable write back cache or write buffer. One drawback to this approach is that few hardware solutions include battery backed up memory and even fewer include unpluggable memory. If the memory is not unpluggable then it lacks the expected RAID-5 protection since a RAID-5 volume's data is expected to survive even if the hardware board itself fails. Unpluggable battery backed cache is short of RAID-5 expectations since the data would be lost if the memory chip itself failed, which is a single point of failure.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
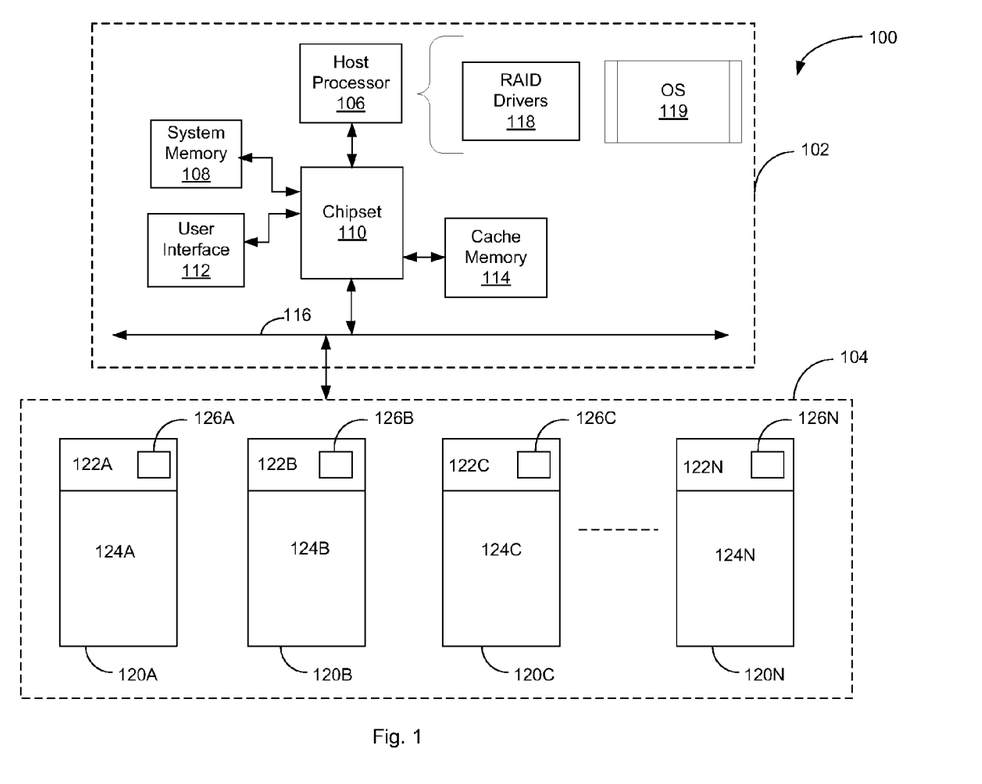
FIG. 1 is a diagram illustrating one exemplary system embodiment.

FIG. 1 is a diagram illustrating one exemplary system embodiment 100 of the present disclosure. The system 100 may generally include a host system 102 configured to control the operation of mass storage system 104. Mass storage system 104 may comprise one or more RAID (redundant array of independent disks) systems. The host system 102 may include, for example, a host processor 106, system memory 108, chipset 110, user interface 112, bus 116 and cache memory 114. The host processor 106 may comprise, for example, any variety of processors known in the art such as an Intel® Pentium® IV processor commercially available from the Assignee of the subject application. Host processor 106, system memory 108, chipset 110 and cache memory 114 may, collectively or individually, comprise one or more integrated circuits. As used in any embodiment herein, and "integrated circuit" (IC) means a semiconductor device and/or microelectronic device, such as, for example, a semiconductor integrated circuit chip.

The bus 116 may include various bus types to transfer data and commands. For instance, bus 116 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus").

Host processor 106 may be configured to execute one or more RAID drivers 118 to control the operation of the RAID system 104 to process RAID-related commands and data. As used herein, "RAID-related data" means data involved in, generated as a result of, used as input or operands in, and/or used in carrying out and/or to facilitate operations involved in implementing and/or maintaining a RAID, such as, for example, RAID system 104. Thus, host processor 106 may be configured to execute one or more I/O (input/output) operations with the RAID system 104 which may include, for example, exchanging commands and data with RAID system 104 to perform one or more RAID-related data read and/or data write operations. To that end, host processor 106 may be configured to perform RAID calculations, for example, one or more arithmetic and/or logical operations using and/or involving RAID-related data, such as, for example, logical exclusive-or (XOR) operations that may generate RAID parity data from initial user data and/or regenerate the initial user data from such RAID parity data. Thus, RAID I/O traffic for the RAID system 104 may be processed through the host system 102.

Additionally, the processor 106 may be configured to execute an operating system (OS) 119, which may include, for example, a general operating system such as Windows XP, Linux, etc. Alternatively or additionally, OS 119 may comprise an embedded OS that may include, for example, BSD variant (OpenBSD, NetBSD, FreeBSD), Linux, Windows CE, and/or other operating system, such as a Real-Time OS (VxWorks, ThreadX, RTLinux). Still alternatively, in other embodiments host system 102 may be configured to execute an OS-absent operational environment (e.g., EFI). In operation, the OS 119 may execute one or more RAID drivers 118 to control the operation of the RAID system 104 coupled to the chipset 114 via bus 116. Of course, the OS 119 and RAID drivers 118 may include a plurality of instructions residing in memory 108.

Chipset 110 may include I/O controller circuitry, such as those commercially available from the assignee of the subject application (e.g., graphics memory and I/O controller hub chipsets), although other integrated circuit chips may also, or alternatively, be used. Chipset 110 also may be coupled to a plurality of mass storage systems via bus 116.

System memory 108 and cache memory 114 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 108 and/or 114 may comprise other types of computer-readable memory. Machine-readable firmware program instructions may be stored in memory 114. As described below, these instructions may be accessed and executed by the host processor 104 and/or the embedded partition 102 of host processor 106. When executed by host processor 106, these instructions may result in host processor 106 performing the operations described herein as being performed by host processor 106. Additionally, cache memory 114 may be configured as a write-through cache that is used to temporarily store RAID data.

RAID system 104 may comprise a plurality of mass storage devices 120A, 120B, 120C, . . . , 120N. Mass storage devices 120A, 120B, 120C, . . . , 120N may include, for example, hard disk drives volumes. RAID system 104 may implement a RAID level, for example RAID 0, RAID 1, . . . , RAID 6. As will be described in greater detail below, one or more drives (volumes) of the RAID system 104 may include a reserved partition, e.g., 122A, 122B, 122C, . . . , 122N and a data partition, e.g., 124A, 124B, 124C, . . . , 124N. The data partition may be configured to store data in accordance with the RAID level implemented by the RAID system 104. Thus, for example, if RAID system 104 implements a RAID 5, data and parity information may be stripped (and interleaved) across the data partitions 124A, 124B, 124C, . . . , 124N of the volumes 120A, 120B, 120C, . . . , 120N.

In this embodiment, host processor 106 may be capable of controlling the chipset 110 to exchange commands and/or data with one or more volumes of the RAID system 104 coupled to chipset 110 using at least one of a plurality of communication protocols. If a Fibre Channel (FC) protocol is used by host processor 106 to exchange data and/or commands with RAID system 104 it may comply or be compatible with the interface/protocol described in "ANSI Standard Fibre Channel Physical and Signaling Interface-3 X3.303: 1998 Specification." Alternatively or additionally, if a serial ATA (SATA) protocol is used by host processor 106 to exchange data and/or commands RAID system 104 it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group earlier and/or later published versions of the SATA standard. Further alternatively or additionally, if a serial attached small computer system interface (SAS) protocol is used by host processor 106 to exchange data and/or commands with RAID system 104, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard. Of course, host processor 106 may be configured to communicate with the RAID system 104 using other and/or after-developed communications protocols without departing from this embodiment.

Host processor 106 may be configured to control one or more mass storage devices 120A, 120B, 120C, . . . , 120N comprised in RAID system 104 to create one or more reserved partitions 122A, 122B, 122C, . . . , 122N. Reserved partitions 122A, 122B, 122C, . . . , 122N may each comprise a non-protected portion of respective volumes 120A, 120B, 120C, . . . , 120N. The capacity of reserved partitions 122A, 122B, 122C, . . . , 122N combined may be at least at large as the memory capacity of cache memory 114. Alternatively, instead of creating a plurality of reserved partitions, one partition may be created on one volume of the RAID system. At least one reserved partition 122A, 122B, 122C, . . . , 122N may be used to store a copy of data that may be temporarily stored in, for example, cache memory 114. Additionally, host processor 106 may be configured to create a table 126A, 126B, 126C, . . . , 126N stored in a respective partition 122A, 122B, 122C, . . . , 122N. Table 126A, 126B, 126C, . . . 126N may comprise mapping information to correlate data contained in partition 122A, 122B, 122C, . . . 122N to respective data partitions 124A, 124B, 124C, . . . , 124N. Mapping operations may be based on, for example, the RAID level implemented by RAID system 104. In at least one embodiment, the table and reserved partition may be created on the same volume of the RAID system 104

Figure 2:
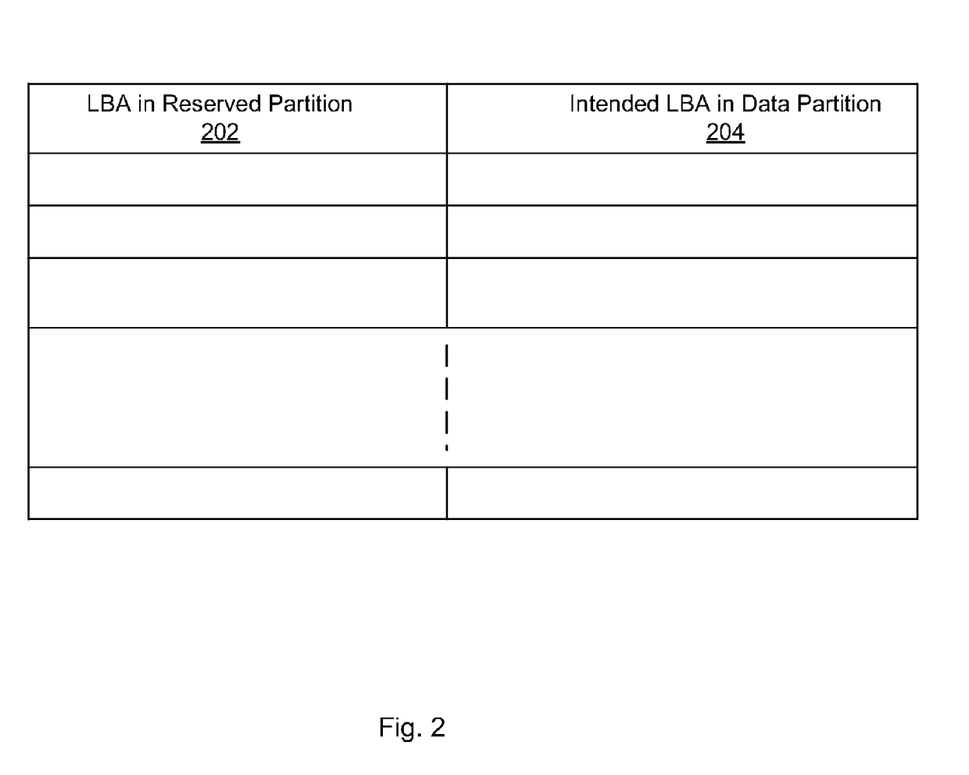
FIG. 2 is a diagram illustrating an exemplary table according to one embodiment.

In operation, host processor 106 may be configured to write data into cache memory 114 in response to request to write data to the RAID system 104. The selection of writing data to cache memory 114 may be based on, for example, one or more caching algorithms (e.g., most-recently used (MRU) algorithms) implemented by RAID drivers 118. Host processor 106 may be further configured to write the data to one or more reserved partitions 122A, 122B, 122C, . . . , 122N, in response to a request to write data to the RAID system 104. Additionally, host processor 106 may be configured to update table 126A, 126B, . . . , and/or 126N. Referring briefly to FIG. 2, and exemplary table 126 is depicted. Table 126 may store logical block address (LBA) information of data in the reserved partition 202 and correlate that data to one or more intended LBAs in the data partition 204 of one or more volumes of the RAID system 104. In this manner, two copies of the data may exist at different locations, and thus, data redundancy (as may be required by a RAID level) may be achieved. Once data is written into one or more reserved partitions 122A, 122B, 122C, . . . , 122N, RAID system 104 may acknowledge a write completion to host system 102. Thus, one disk I/O transactions (a data write to one or more reserved partitions 122A, 122B, 122C, . . . , 122N) may complete a RAID data write to RAID system 104. In addition, since RAID data write may be completed by writing to one volume of the RAID system 104, write throughput and overall efficiency of the system 100 may be improved. Additionally, host processor 106 may be configured to service data read requests for addresses corresponding to previous data write requests from cache memory 114, instead of reading data from RAID system 104.

When data stored in cache memory 114 is demoted (e.g., removed and/or replaced with other data because of infrequent access), host processor 106 may be configured to control RAID system 104 to write the demoted data from cache onto the volumes 120A, 120B, 120C, . . . , 120N of the RAID system 104, according to the RAID level implemented by the RAID system 104. The space on the reserved partition 122A, 122B, 122C and/or 122N corresponding to the demoted data may be then used for additional data (e.g., newly promoted data in cache memory 114). In alternative embodiments, instead of waiting for data in cache memory 114 to be demoted before committing the data to the RAID system in accordance with the RAID level, host processor 106 may be configured to transfer data from cache memory 114 onto volumes 120A, 120B, 120C, . . . , 120N of the RAID system 104 during, for example, preselected idle times of host processor 106 and/or host system 102.

In the event of a failure of cache memory 114, host processor 106 may be configured to recover the data by reading table 126A, 126B, 126C, . . . , 126N to determine the intended LBA information corresponding to the volumes of the RAID system 104. The host processor 106 may be further configured to read data stored in one or more partitions 122A, 122B, 122C, . . . , 122N and write the data stored therein onto the data partitions of the volumes 120A, 120B, 120C, . . . , 120N of the RAID system 104, according to the RAID level implemented by the RAID system 104. Failure of cache memory 114 may result from, for example, power failure of host system 102, host system failure, and/or failure of the cache memory 114 itself. If the host system 102 fails, recovery of the data may include replacing the host system and RAID drivers to enable reading of one or more partitions 122A, 122B, 122C, . . . , 122N of the RAID system 104.

In the event of a failure of one or more volumes 120A, 120B, 120C, . . . , 120N of the RAID system 104, host processor 106 may be configured to demote the data in cache memory 114 to the remaining volumes of the RAID system 104. For example, if the RAID level is a protected RAID level (e.g., RAID 5), the data in cache memory 114 may be demoted, and the demoted data may be written to the remaining RAID volumes, per the RAID operations implemented by drivers 118. Additionally, host processor 106 may be configured to perform one or more RAID-related recovery operations which may include, for example, X-OR operations to recover additional data based on parity information contained on one or more remaining volumes of the RAID system 104. Host processor 106 may be further configured to perform future read and/or write operations after a failed volume is detected according to a RAID level implemented by RAID system 104.

Figure 3:
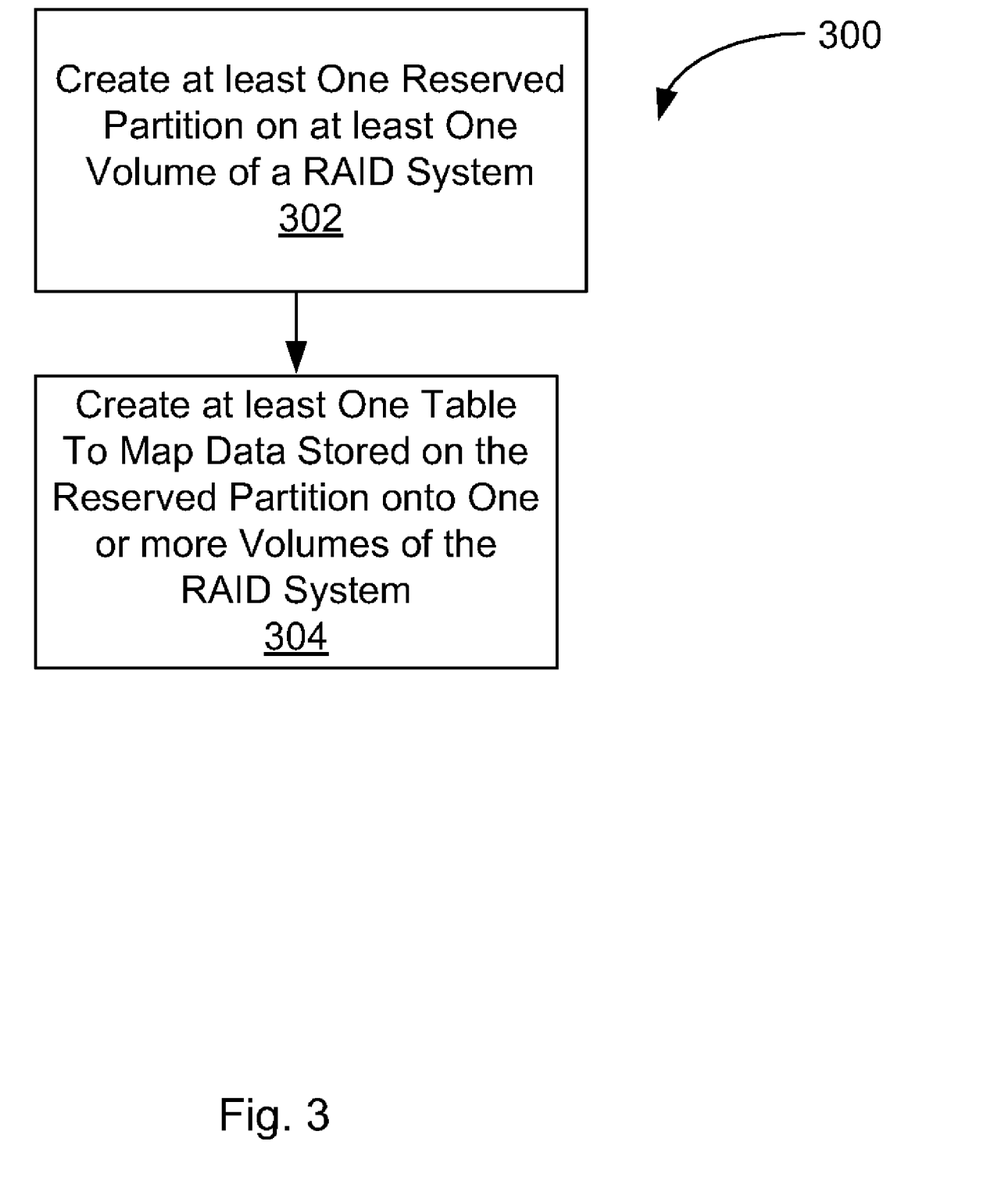
FIG. 3 is a diagram illustrating exemplary operations according to one embodiment.

FIG. 3 is a flowchart 300 illustrating exemplary operations that may be performed according to one embodiment. Operations may include creating at least one reserved partition on at least one volume of a RAID system 302. Operations may also include creating at least one table to map data stored on the reserved partition onto one or more volumes of the RAID system 304.

Figure 4:
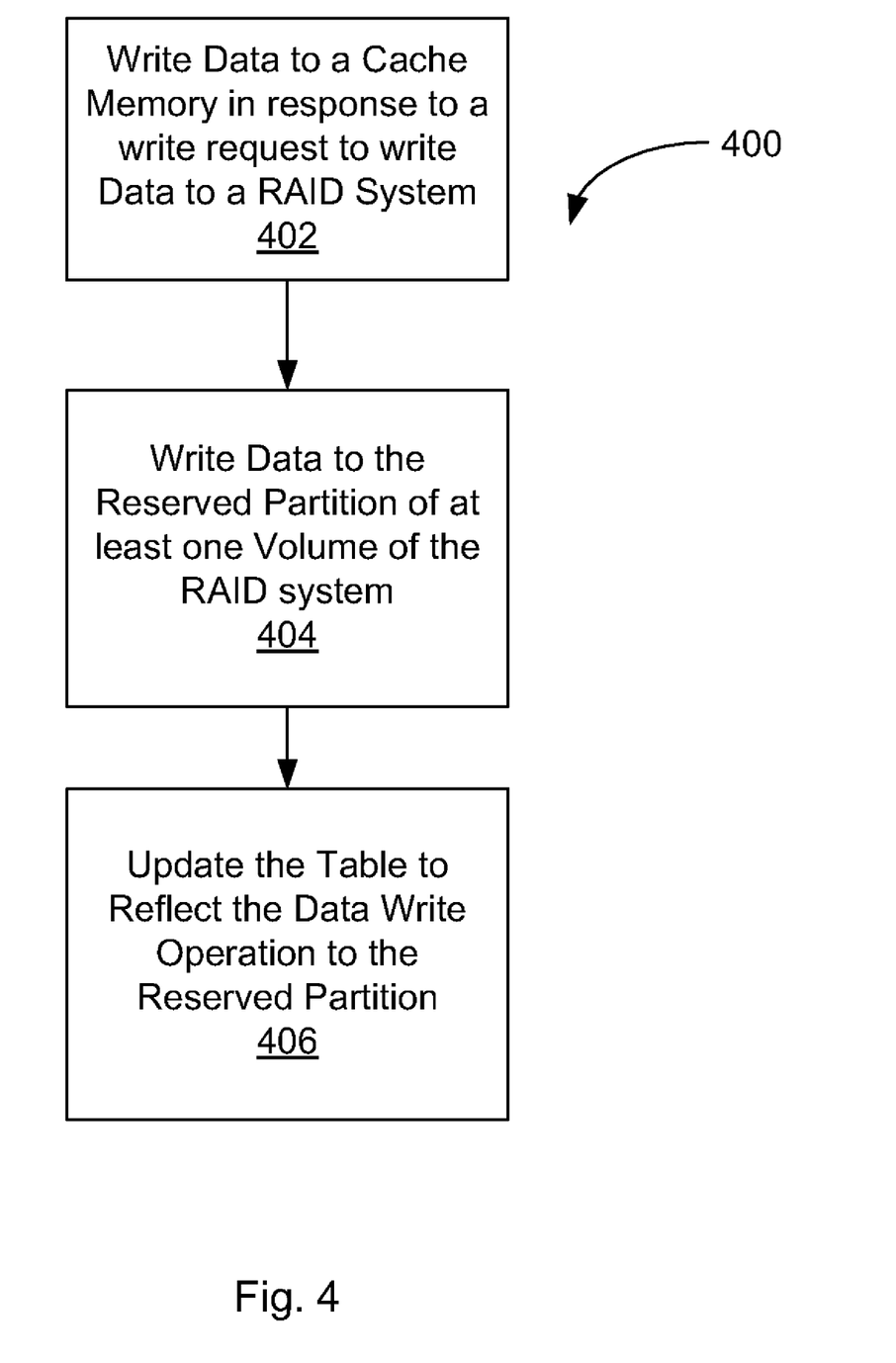
FIG. 4 is a diagram illustrating exemplary operations according to another embodiment.

FIG. 4 is a flowchart 400 illustrating exemplary operations that may be performed according to another embodiment. Operations may include writing data to a cache memory in response to a write request to write data to a RAID system 402. Operations may further include writing said data to the reserved partition of at least one volume of the RAID system 404. Operations may also include updating the table to reflect the data write operation to the reserved partition and to correlate data in the reserved partition to one or more volumes of the RAID system 406.

Figure 5:
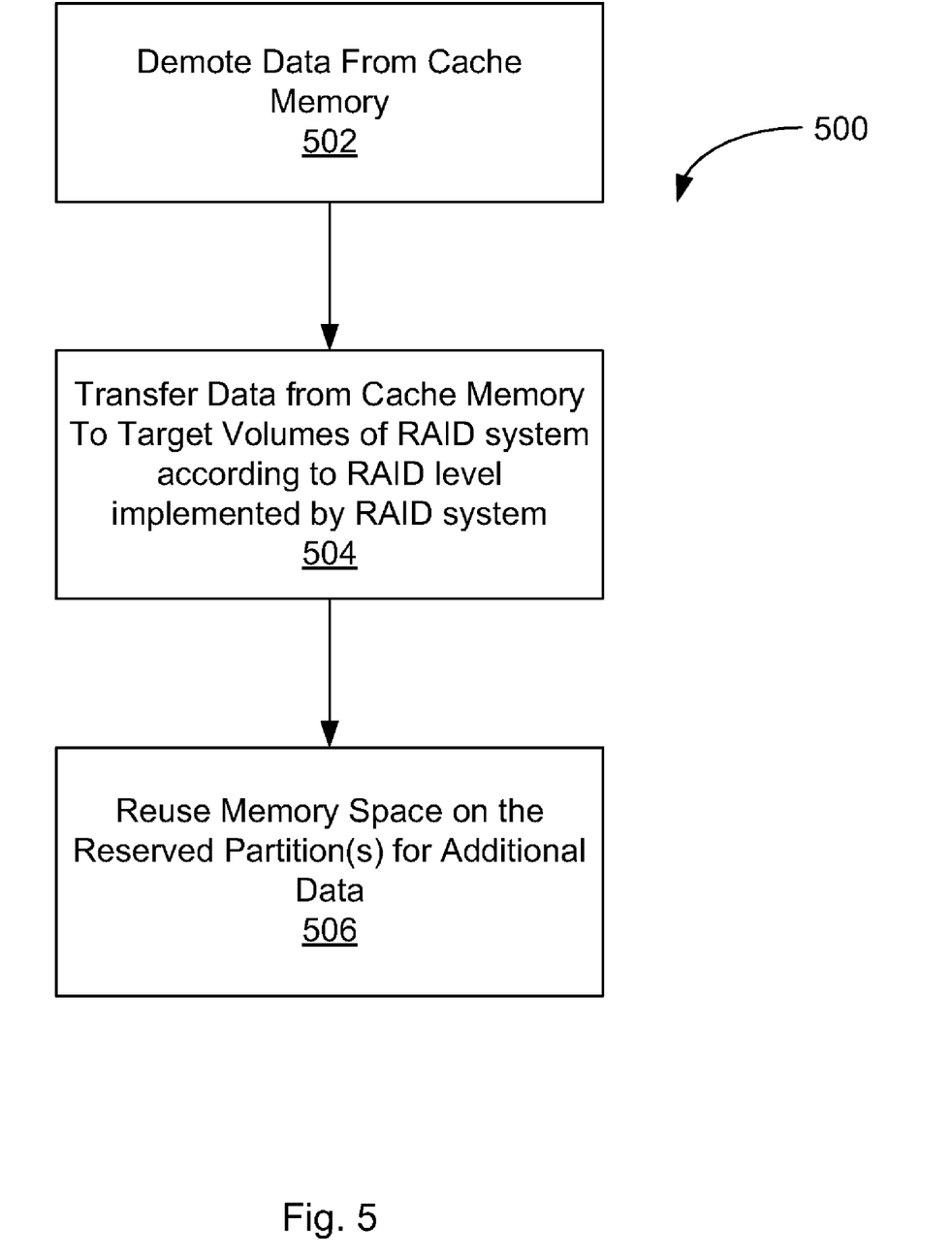
FIG. 5 is a diagram illustrating exemplary operations according to another embodiment.

FIG. 5 is a flowchart 500 illustrating exemplary operations that may be performed according to another embodiment. Operations may include demoting data from cache memory 502. Operations may further include transferring data from cache memory to target volumes of a RAID system according to a RAID level implemented by the RAID system 504. Operations may also include reusing memory space on the reserved partition(s) for additional data 506.

Figure 6:
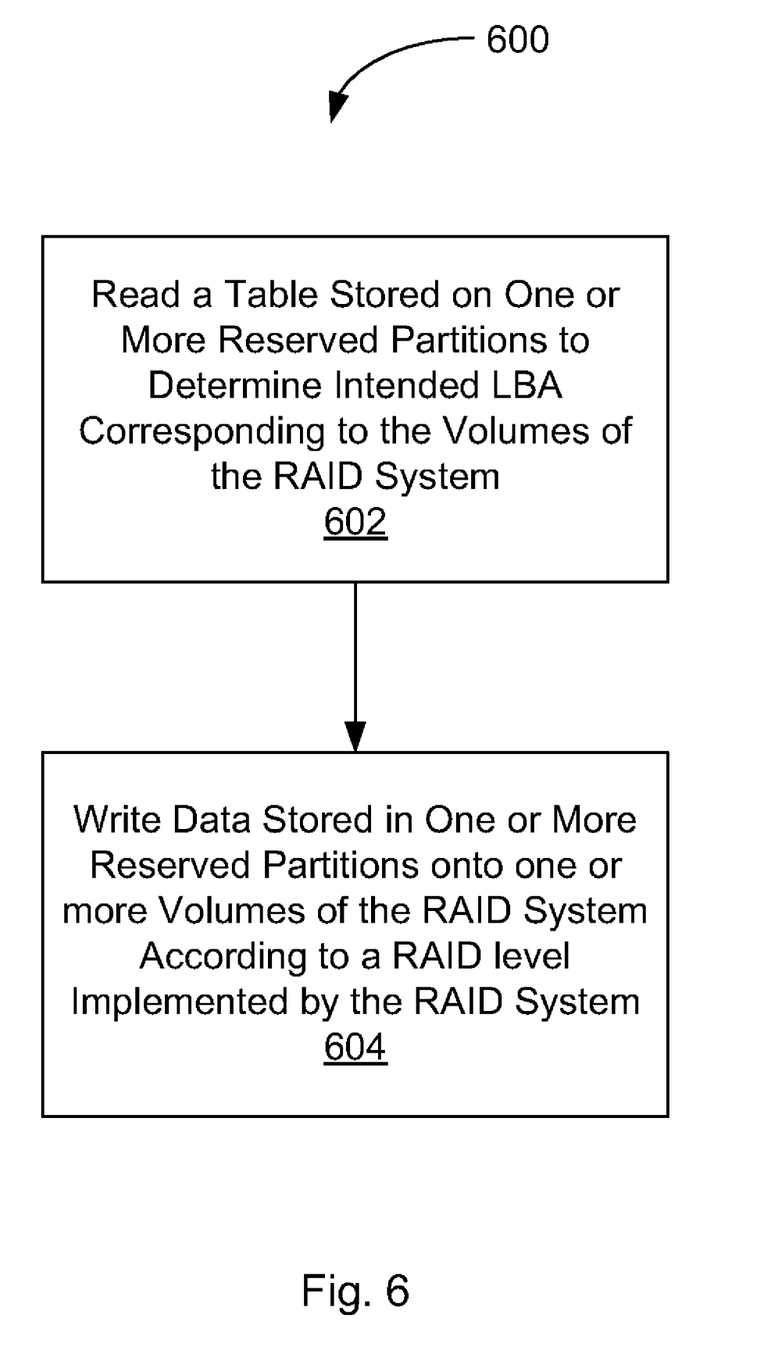
FIG. 6 is a diagram illustrating exemplary operations according to another embodiment.

FIG. 6 is a flowchart 600 illustrating exemplary operations that may be performed according to another embodiment. The operations of this embodiment may be performed in the event of a failure of cache memory storing RAID-related data (for example, a cache memory on a host system). To determine where to store the data on the data partitions of the RAID volumes, operations may include reading a table stored on one or more reserved partitions to determine intended LBA information corresponding to the one or more volumes of the RAID system 604. Operations may additionally include writing data stored in one or more reserved partitions onto one or more volumes of the RAID system according to a RAID level implemented by the RAID system 604.

Figure 7:
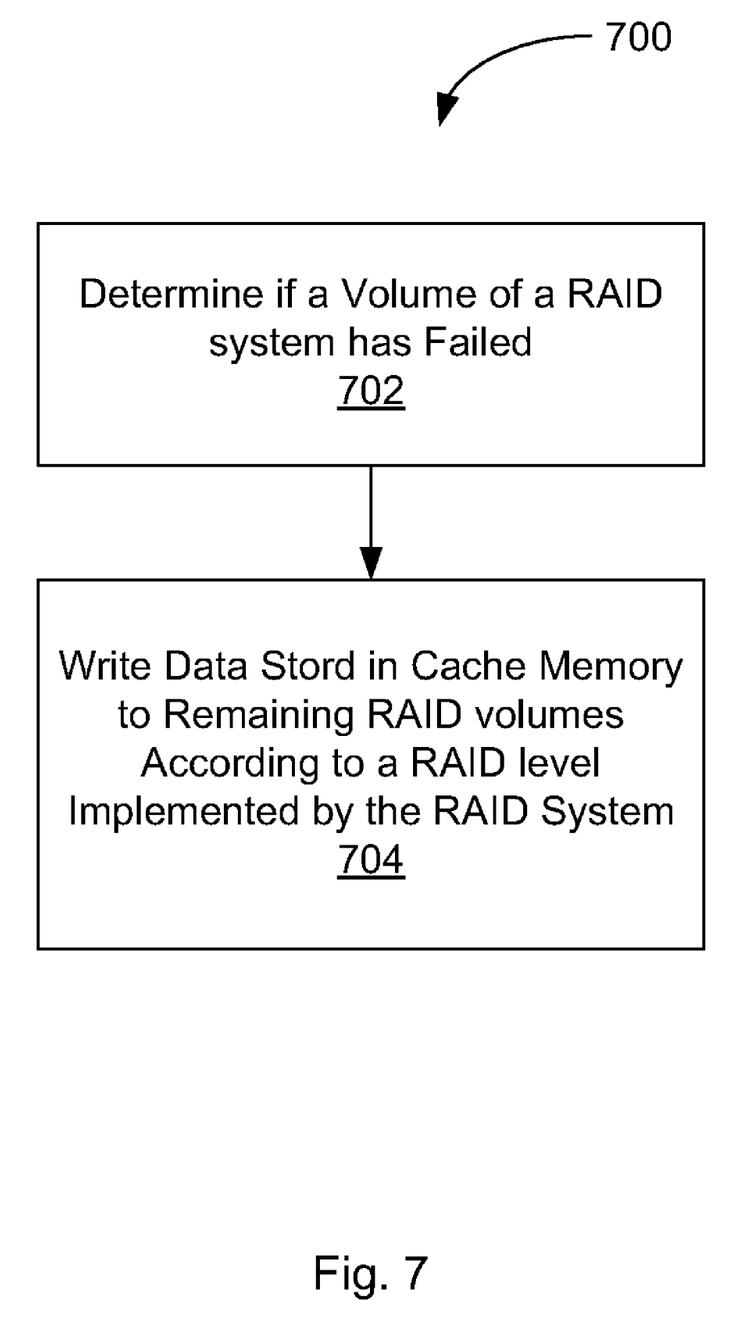
FIG. 7 is a diagram illustrating exemplary operations according to another embodiment.
Figure 8:
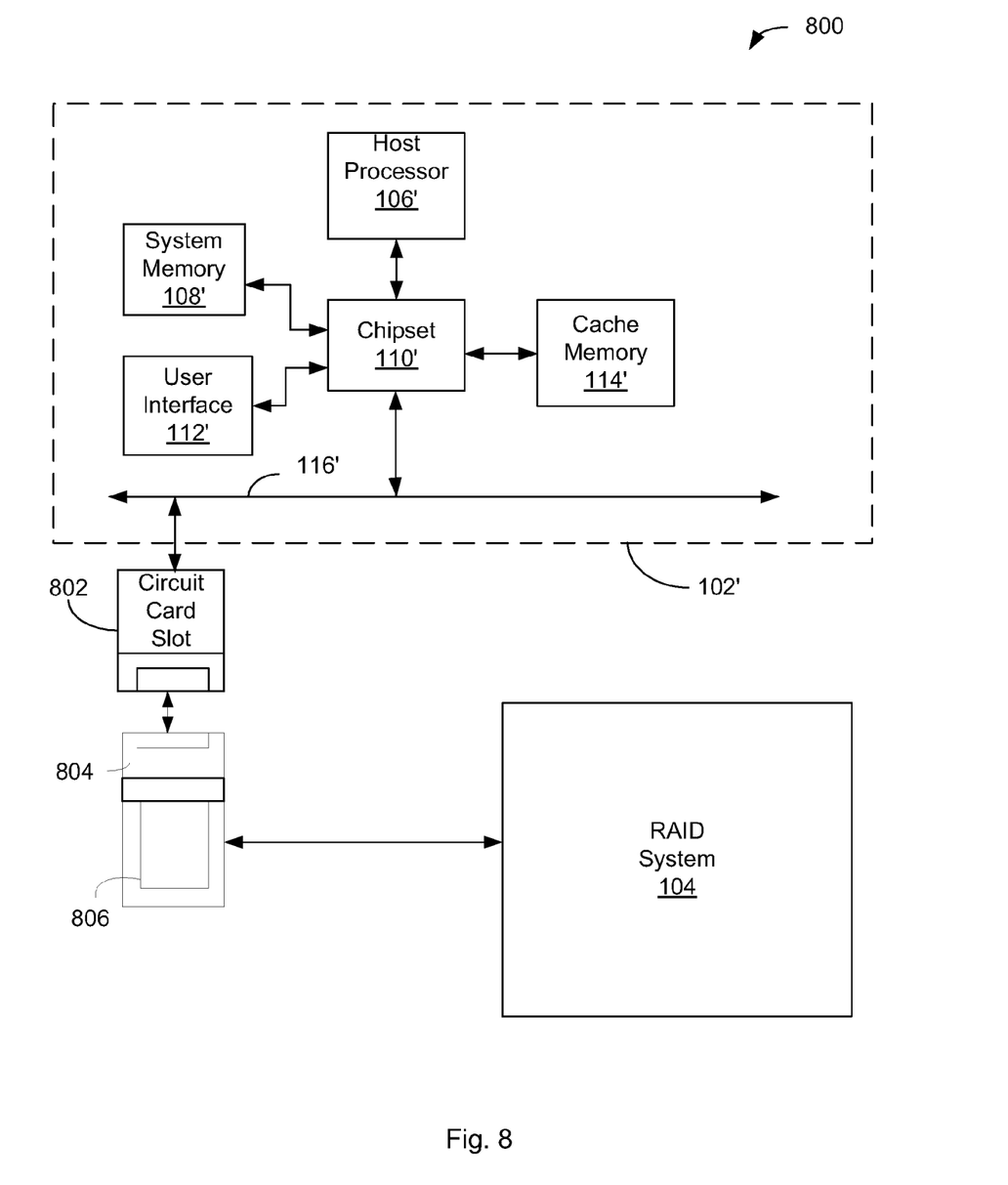
FIG. 8 is a diagram illustrating another exemplary system embodiment.

FIG. 7 is a flowchart 700 illustrating exemplary operations that may be performed according to another embodiment. The operations of this embodiment may be performed in the event of a failure of a volume of a RAID system. Operations may include determining if a volume of a RAID system has failed 702. Operations may additionally include writing data stored in cache memory to the remaining volumes of the RAID system according to a RAID level implemented by the RAID system 704. For example, if the RAID system implements a RAID 5 level, data written from cache memory into the remaining volumes of the RAID system may be written using a degraded write algorithm. Thereafter, additional read and/or write operations and/or failed volume replacement may be performed according to the RAID implementation FIG. 8 illustrates another exemplary system embodiment 800. The system 800 may generally include a host system 102' that may include a host processor 106', a first bus 116', a user interface system 112', a chipset 110', system memory 108, and cache memory 114'. The host system 102' of this embodiment may also include a circuit card slot 802 and a circuit card 804. Circuit card 804 may be coupled to bus 116' (via circuit card slot 802). In this embodiment, circuit card 804 may be coupled to, and control the operation of, RAID system 104. The operational features of this embodiment may be similar to those described above with reference to FIGS. 1-7. However, in this embodiment, the operational features of host processor 106 in reference to RAID-related operations may be implemented, for example, in an integrated circuit 806 comprised in the circuit card 804. For example, circuit card 802 may comprise a host bus adapter (HBA) and integrated circuit 806 may comprise a protocol engine capable of controlling the operation of, and exchanging commands and data with, RAID system 104.

In alternative embodiments, the operative circuitry of the host system 102 may be integrated within one or more integrated circuits of a computer node element, for example, integrated into a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit. In still other embodiments, the operative circuitry provided herein may be provided in the RAID system 104 and/or in any system, processor, integrated circuit or methodology that may control the operation of a RAID system.

Thus, in summary, at least one embodiment herein may include an integrated circuit (IC) configured to control the operation of, and exchange commands and data with, a redundant array of independent disks (RAID) system. The IC may be further configured to create at least one reserved partition on at least one volume of the RAID system and create a table to map data stored in at least one reserved partition to at least one intended volume address of at least one volume of the RAID system. The IC of this embodiment may be further configured to write data associated with a RAID data write request into cache memory, write the data into at least one reserved partition and update the table to reflect data stored in said at least one reserved partition. According to at least another embodiment herein, an article may comprise a storage medium storing instructions that when executed by a machine result in the following operations: creating at least one reserved partition on at least one volume of A RAID system; creating a table to map data stored in said at least one reserved partition to at least one intended volume address of at least one volume of said RAID system; writing data associated with a RAID data write request into the cache memory; writing said data into said reserved partition; and updating said table to reflect data stored in said at least one reserved partition.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an integrated circuit (IC) configured to control the operation of, and exchange commands and data with, a redundant array of independent disks (RAID) system, said IC is further configured to create at least one reserved partition on at least one volume of said RAID system and create a table to map data stored in at least one reserved partition to at least one intended volume address of at least one volume of said RAID system, said IC is further configured to write data associated with a RAID data write request into cache memory, write the data into at least one reserved partition and update said table to reflect data stored in said at least one reserved partition; wherein writing said data to cache memory and said reserved partition occurs in one disk I/O transaction; wherein said at least one reserved partition is at least as large as the memory capacity of said cache memory, and wherein said IC is further configured to demote data from said cache memory and to transfer data from said cache memory to one or more volumes of said RAID system according to a RAID level implemented by said RAID system, and to reuse the data space on said cache memory corresponding to the transferred data for additional data to be stored in said cache memory.

2. The apparatus of claim 1, wherein:
said IC is further configured to execute one or more RAID-related calculations, based on, at least in part, a RAID level implemented by said RAID system.

3. The apparatus of claim 1, wherein:
said RAID system is configured to implement a RAID level of 1 or a RAID level greater than 1.

4. The apparatus of claim 1, wherein:
said IC is further configured to service at least one RAID data read request from said cache memory.

5. The apparatus of claim 1, wherein:
in the event of a failure of said cache memory, said IC is further configured to read said table to determine at least one intended volume address, for data stored in at least one reserved partition, corresponding to at least one volume of the RAID system and writing, based on the table, data stored in one or more reserved partitions onto at least one volume of the RAID system according to a RAID level implemented by the RAID system.

6. The apparatus of claim 1, wherein:
in the event of a failure of a volume of the RAID system, said IC is further configured to write data stored in cache memory to the remaining RAID volumes according to a RAID level implemented by the RAID system.

7. A system, comprising:
at least one circuit card being capable of being coupled to a bus, said circuit card comprising an integrated circuit (IC), said IC is configured to control the operation of, and exchange commands and data with, a redundant array of independent disks (RAID) system, said IC is further configured to create at least one reserved partition on at least one volume of said RAID system and create a table to map data stored in at least one reserved partition to at least one intended volume address of at least one volume of said RAID system, said IC is further configured to write data associated with a RAID data write request into cache memory, write the data into at least one reserved partition and update said table to reflect data stored in said at least one reserved partition; wherein writing said data to cache memory and said reserved partition occurs in one disk I/O transaction; wherein said at least one reserved partition is at least as large as the memory capacity of said cache memory and wherein said IC is further configured to demote data from said cache memory and to transfer data from said cache memory to one or more volumes of said RAID system according to a RAID level implemented by said RAID system, and to reuse the data space on said cache memory corresponding to the transferred data for additional data to be stored in said cache memory.

8. The system of claim 7, wherein:
said IC is further configured to execute on or more RAID-related calculations, based on, at least in part, a RAID level implemented by said RAID system.

9. The system of claim 7, wherein:
said RAID system is configured to implement a RAID level of 1 or a RAID level greater than 1.

10. The system of claim 7, wherein:
in the event of a failure of said cache memory, said IC is further configured to read said table to determine at least one intended volume address, for data stored in at least one reserved partition, corresponding to at least one volume of the RAID system and writing, based on the table, data stored in one or more reserved partitions onto at least one volume of the RAID system according to a RAID level implemented by the RAID system.

11. The system of claim 7, wherein:
in the event of a failure of a volume of the RAID system, said IC is further configured to write data stored in cache memory to the remaining RAID volumes according to a RAID level implemented by the RAID system.

12. The system of claim 7, wherein:
said IC is further configured to service at least one RAID data read request from said cache memory.

13. A method, comprising:
creating at least one reserved partition on at least one volume of a redundant array of independent disks (RAID) system;
creating a table to map data stored in said at least one reserved partition to at least one intended volume address of at least one volume of said RAID system;
writing data associated with a RAID data write request into a cache memory;
writing said data into said reserved partition, wherein writing said data to cache memory and said reserved partition occurs in a single one disk I/O transaction;
updating said table to reflect data stored in said at least one reserved partition;
demoting data from said cache memory;

transferring data from said cache memory to one or more volumes of said RAID system according to a RAID level implemented by said RAID system; and reusing the data space on said cache memory corresponding to the demoted data for additional data to be stored in said cache memory;

wherein said at least one reserved partition is at least as large the memory capacity of said cache memory.

14. The method of claim 13, further comprising:

executing on or more RAID-related calculations, based on, at least in part, a RAID level implemented by said RAID system.

15. The method of claim 13, wherein:

said RAID system is configured to implement a RAID level of 1 or a RAID level greater than 1.

16. The method of claim 13, further comprising:

servicing at least one RAID data read request from said cache memory.

17. The method of claim 13, further comprising:

in the event of a failure of said cache memory, reading said table to determine at least one intended volume address, for data stored in at least one reserved partition, corresponding to at least one volume of the RAID system, and;

writing, based on the table, data stored in one or more reserved partitions onto at least one volume of the RAID system according to a RAID level implemented by the RAID system.

18. The method of claim 13, further comprising:

in the event of a failure of a volume of the RAID system, writing data stored in cache memory to the remaining RAID volumes according to a RAID level implemented by the RAID system.

* * * * *